Patented June 29, 1954

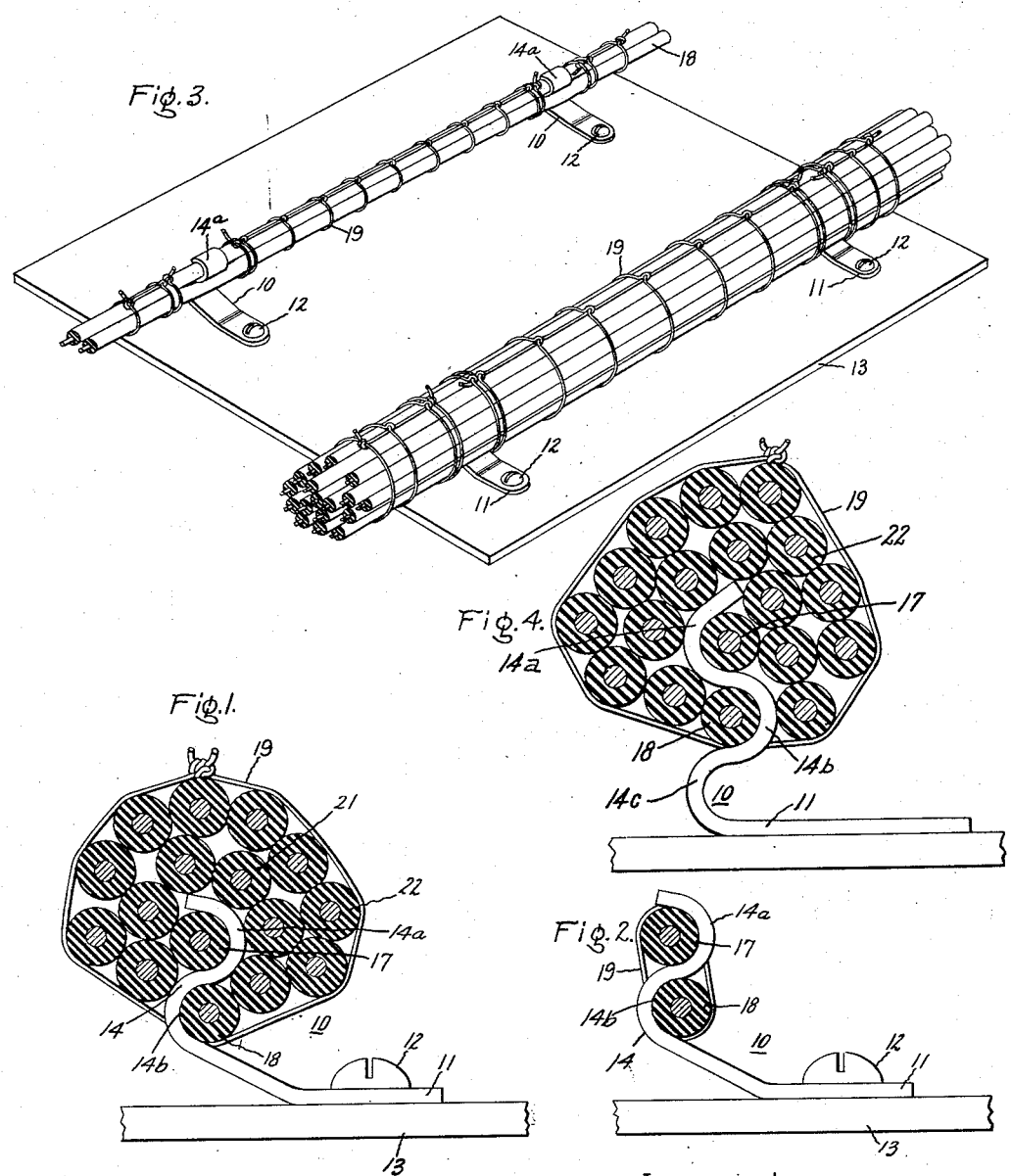

2,682,384

UNITED STATES PATENT OFFICE 2,682,384

DOUBLE HOOK WIRING CLEAT

Charles D. Eichelberger, Ridley Park, Pa., assignor to General Electric Company, a corporation of New York Application September 10, 1948, Serial No. 48,691

4 Claims. (Cl. 248—68)

The invention relates to wiring cleats, particularly of the strip type having a projecting end of sinuous form so as to be capable of supporting insulated wires that are laced or otherwise bound into a cable as is usually the case with switchgear control wiring or in other similar service involving a multiplicity of wires.

One object is to provide an impdoved embroidered double-hook sinuous strip form of wire cable supporting means that is self-locking with the wires bound together to form the cable.

Another object is to provide a unitary angulated and sinuously ending strip form of cleat that is equally suitable for supporting a few or many wires bound into a cable and having a sinuous or S-shaped double-hook end of the cleat embedded inside the cable when formed of many wires and the other angulated and offset end of the cleat extending laterally from the cable to facilitate mounting the cleat.

Further objects and advantages of the invention will appear in the following description of the accompanying drawing in which Fig. 1 is a side view of the improved S-shaped sinuously ending and angulated strip form of wiring cleat shown supporting a cable composed of many wires bound together around the S-shaped double-hook end of the cleat; Fig. 2 is a similar view showing the cleat supporting only a two-wire cable; Fig. 3 is a perspective view of a panel having both the two-wire cable and the multi-wire cable mounted thereon by means of the improved S-shaped double-hook form of cleat and Fig. 4 shows a modified form of the cleat.

As shown in Fig. 1, the improved sinuously ending and angulated strip form of wiring cleat indicated generally by the reference character 10 has the angulated end 11 thereof forming an offset support and provided with a suitable hole for the mounting screw 12 that removably secures the cleat to the panel 13. The other sinuous end 14 of the cleat 10 is formed into an S-shaped double hook for oppositely anchoring in the reversed hooks 14a and 14b a pair of adjacent wires 17 and 18 that are bound into a cable by the lacing 19 as indicated in Figs. 1 and 2. Thus when only the two wires 17 and 18 are bound together to form the cable as shown in Fig. 2, the hook 14a formed at the sinuous end of the wiring cleat seats the wire 17 so as to prevent movement of the cable in all directions except to the right, while the reversed hook 14b formed adjacent the first hook oppositely seats the wire 18 so as to prevent movement of the cable in all directions except to the left. In this way, a separate wire of the cable is seated in each hook of the double hook member 10 to be oppositely hooked thereby and thus lock the cable on the member. Consequently, the double hooks 14a and 14b cooperate with the wires 17 and 18 to prevent movement of the cable formed thereby in any direction.

When a multiplicity of wires are extended transverse the double-hooked end of the wiring cleat 10 to be laced together into the cable as indicated in Fig. 1, a pair of anchoring wires 17 and 18 are each seated in a corresponding one of the hooks 14a and 14b to be oppositely hooked in exactly the same way as just described in connection with Fig. 2. In addition, the adjacent layer of wires 21 inside the cable are compacted around the anchoring wires 17 and 18 so as to engage therewith as well as with the sides of the S-shaped double-hook end of the cleat 10 to be supported thereby while the outside layer of wires 22 is in turn compacted around the intermediate layer of wires 21 so as to be firmly supported thereby. Thus all of the wires in the multi-wire cable shown in Fig. 1 are firmly supported by the cleat 10 with the S-shaped double-hook end 14 thereof embedded inside the cable before the wires are bound together by means of the lacing 19.

As shown in Fig. 3, the two-wire cable is easily and quickly mounted on the panel 13 by first securing the two spaced-apart cleats 10 thereto by means of the mounting screws 12. Then the wire 17 is seated in the hooked end 14a of each cleat 10 and the wire 18 oppositely seated in the adjacent reversed hook portion 14b of the cleat and the lacing 19 applied to bind the wires together into a cable. Likewise, the multi-wire cable is mounted on the panel 13 in substantially the same way except that the intermediate layer of wires 21, together with the outer layer 22, are laid or bunched substantially symmetrically around the two anchoring wires 17 and 18 before the lacing 19 is applied. Due to the offsetting of the supporting end 11 of the strip 10, ample room is provided between the cable and the panel 13 for applying the lacing 19. Also, the mounting screws 12 are readily accessible in case it is desired to bodily remove the cable from the panel.

In the modified form of cleat shown in Fig. 4, a third hook portion 14c is provided in the cleat 10 between the double hook portions 14a and 14b within which the wires forming the cable are mounted and the laterally offset end 11 that forms the support for the cleat. This third looped or hooked portion 14c insure uniform spacing of the wire-supporting hooks or loops 14a and 14b particularly when the supporting end 11 of the cleat is spot-welded to a metal panel.

What I claim as new and desire to secure by Letters Patent of the United States is:

1. The combination of a supporting strip having a sinuous S-shaped double-hook end and having the other end thereof angulated to form a support offset to one side of the S-shaped double-hook end of the strip, a plurality of wires extended transverse of the double-hook end of the strip to seat a separate wire in each hook thereof, and means to bind the wires to form a cable having a pair of the wires oppositely hooked by the double-hook end of the strip to lock the cable on the strip.

2. In combination, a plurality of wires, means to bind the wires to form a cable, and means for supporting the cable comprising a strip having an angulated supporting end offset to one side of the cable and a sinuous end forming an S-shaped double hook extending inside the cable to seat a separate wire in each hook and thereby lock the cable on the strip.

3. In combination, a plurality of wires, means to bind the wires to form a cable, and means for supporting the cable comprising a strip having an angulated end forming a support at one side of the cable and a sinuous end forming a hook extending inside the cable to seat therein one of the wires of the cable and a reverse hook adjacent said first hook for oppositely seating therein another wire of the cable to lock the cable on the strip.

4. The combination of a wiring cleat comprising a strip having a sinuous S-shaped double-hook end and having the other end thereof angulated to form a support offset to one side of the S-shaped double hook end of the strip and provided with a spacing loop interposed between the offset supporting end and the S-shaped double hook end of the strip, a plurality of wires extended transverse the double hook end of the strip to seat a separate wire in each hook thereof, and means to bind the wires to form a cable having a pair of wires oppositely hooked by the S-shaped double-hooked end of the strip to lock the cable on the member.

References Cited in the file of this patent

UNITED STATES PATENTS

| Number | Name | Date |
| --- | --- | --- |
| 1,423,507 | Allen | July 25, 1922 |
| 2,039,387 | Burke et al. | May 5, 1936 |
| 2,104,612 | Droll | Jan. 4, 1938 |
| 2,297,877 | De Bruin | Oct. 6, 1942 |

FOREIGN PATENTS

| Number | Country | Date |
| --- | --- | --- |
| 10,055 | Great Britain | of 1904 |
| 90,067 | Austria | of 1922 |
| 103,175 | Sweden | Oct. 2, 1941 |